UNITED STATES PATENT OFFICE.

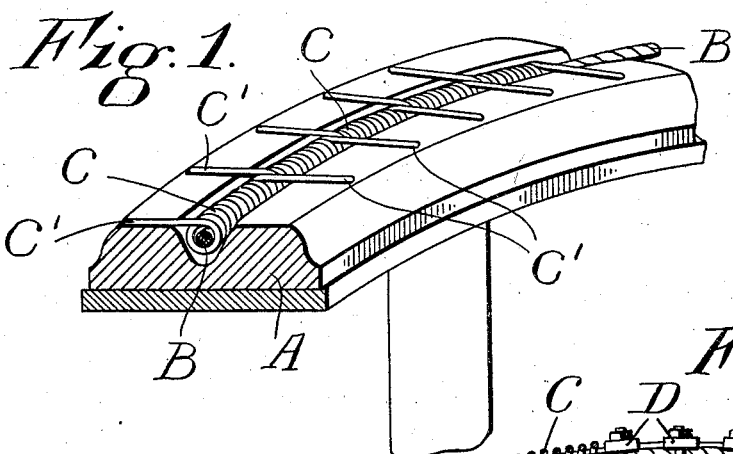

RALPH L. MORGAN, OF WORCESTER, MASSACHUSETTS.

TIRE ATTACHMENT.

1,054,980.  Specification of Letters Patent.  Patented Mar. 4, 1913.

Application filed April 3, 1912. Serial No. 688,341.

*To all whom it may concern:*

Be it known that I, RALPH L. MORGAN, a citizen of the United States, residing at Worcester, in the county of Worcester and State of Massachusetts, have invented a new and useful Tire Attachment, of which the following is a specification.

The object of this invention is to provide a new and improved tire attachment especially adapted for use in connection with the double faced or solid tires commonly employed on heavy automobiles or trucks. These tires usually consist of two faces separated by a groove.

The improved tire attachment consists of a central supporting member or strand for fitting between the tire faces, with means for securing the ends of the strands together or in position, and of a plurality of friction members each comprising a coiled spring having projecting ends which will extend over the tire faces. The friction members preferably are loosely strung on the central supporting member. The invention also consists of details of construction hereinafter described and claimed.

The invention is shown in the accompanying drawing, referring to which,

Figure 1 is a partial elevation of a tire with my attachment applied thereto. Fig. 2 is an enlarged perspective view of one of the friction members, Fig. 3 is a partial sectional view illustrating one way the central supporting member can be held in position, and Figs. 4, 5 and 6 are views similar to Fig. 3 illustrating modifications.

Referring to the drawing and in detail, A designates a double faced tire.

B designates the central supporting member which can be made in the form of a wire rope or cable having its ends secured by clamps D as in Fig. 3. The supporting member can be in the form of a rod 32 having its ends reversely threaded and which ends can be held together by a right and left coupling D².

C designates the friction members. Each member consists of a wire coiled to form a spring with projecting ends C'—C', which, when the attachment is in position, will extend laterally over the tire faces and thus will afford a gripping surface under the tires, which will increase traction and prevent skidding.

In the construction thus far described, the attachment can slip or creep around the tire. If it is desired to prevent the attachment from slipping around the tire, the arrangement shown in Fig. 4 is employed. In this arrangement the central supporting member B' is made in the form of a wire rope B', the ends of which are drawn through holes bored through the tire and through the felly, and clamps D'—D' are secured on the ends of the rope to hold the same in position. The friction members C are strung on the wire rope in the manner similar to that in which they are strung on the rod B.

The peculiar construction of friction members allows a spring relief for the bearing ends so that the same will accommodate themselves easily to the conditions of the road and to the stress placed thereon.

By the arrangements described, a simple and efficient attachment for the purposes described are provided.

An additional improvement is shown in Fig. 6 designed for the purpose of causing the attachment to cling to the tire when it wears down. For this purpose the ends of the cables B³ have eyes at the ends formed by splicing and these are connected by a spring C³ normally under enough tension to permit the eyes to come closer together when the tire wears, without permitting the attachment to get loose.

The details and arrangements herein shown and described may be greatly varied by a skilled mechanic without departing from the scope of the invention as expressed in the claims.

Having thus fully described my invention, what I desire to secure by Letters-Patent is:—

1. A tire attachment for a double faced tire, comprising a central supporting member for fitting between the tire faces, and a plurality of friction members loosely mounted thereon, each comprising a coiled spring having projecting ends which will extend over the tire faces.

2. A tire attachment for a double faced tire, comprising a central strand encircling the tire, means for connecting the ends of the strand so that the same will fit between the tire faces, and a plurality of friction members loosely strung thereon and arranged end to end in contact with each other, each comprising a coil of wire having oppositely projecting ends one extending over each tire face.

3. A tire attachment comprising a circular supporting member adapted to surround a tire, and a plurality of friction members loosely mounted thereon end to end, each comprising a coil and having a flat projection extending laterally from said coil over the tire face.

In testimony whereof I have hereunto set my hand, in the presence of two subscribing witnesses.

RALPH L. MORGAN.

Witnesses:
  EDWIN CHURCHETS, Jr.,
  ANTHONY G. JACKSON.